(12) United States Patent
Merritt et al.

(10) Patent No.: US 6,421,429 B1
(45) Date of Patent: Jul. 16, 2002

(54) NETWORK-BASED SYSTEM ENABLING IMAGE COMMUNICATIONS

(75) Inventors: Andrew C. Merritt, Basking Ridge; Kenneth H. Rosen, Middletown, both of NJ (US)

(73) Assignee: AT&T Corporation, New York, NY (US)

( * ) Notice: Subject to any disclaimer, the term of this patent is extended or adjusted under 35 U.S.C. 154(b) by 0 days.

(21) Appl. No.: 09/040,719

(22) Filed: Mar. 18, 1998

Related U.S. Application Data

(63) Continuation-in-part of application No. 08/636,200, filed on Apr. 22, 1996, now abandoned, which is a continuation of application No. 08/175,022, filed on Dec. 2, 1993, now abandoned.

(51) Int. Cl.[7] .............................................. H04M 11/00
(52) U.S. Cl. ................................ 379/93.17; 379/93.15; 379/100.13
(58) Field of Search ......................... 379/93.15, 100.13, 379/88.13, 88.14, 100.08, 100.09, 93.08; 707/523, 526

(56) References Cited

U.S. PATENT DOCUMENTS

| | | | | |
|---|---|---|---|---|
| 5,091,931 A | * | 2/1992 | Milewski ............... | 379/100.13 |
| 5,287,199 A | * | 2/1994 | Zoccolillo ............... | 379/100.13 |
| 5,333,266 A | * | 7/1994 | Boaz et al. ............... | 379/93.15 |
| 5,406,557 A | * | 4/1995 | Baudoin .................. | 379/93.15 |
| 5,459,775 A | * | 10/1995 | Isono et al. ............... | 379/93.15 |
| 5,524,137 A | * | 6/1996 | Rhee ..................... | 379/100.13 |
| 5,740,231 A | * | 4/1998 | Cohn et al. ............... | 379/93.01 |
| 5,872,926 A | * | 2/1999 | Levac et al. ........... | 379/100.13 |
| 6,119,137 A | * | 9/2000 | Smith et al. ................ | 707/523 |

* cited by examiner

*Primary Examiner*—Stella Woo
(74) *Attorney, Agent, or Firm*—Morgan & Finnegan, L.L.P.

(57) ABSTRACT

A system is disclosed which enables a multitude of dissimilar end-system devices, appliances, and platforms to interchange image information. The inventive method utilizes a directory database of end-user profiles, a session manager, a conversion manager, individual conversation processors, a queuing database, and a store-and-forward file-folder database. The system accommodates pre-subscribed end-users as well as non-subscription users. The system handles both real-time and store-and-forward communications modes. The present invention may be practiced as either a one-node or a multi-node distributed architecture, scalable as required, and may be either network-based or premises-based, or a hybrid combination of these. Communications transport both into and out of the node(s) can range from voiceband telephone on analog circuits to high speed channel or fact-packet protocol communications modes.

25 Claims, 9 Drawing Sheets

NETWORK-BASED IMAGE PROTOCOL
AND
FILE FORMAT DATABASE

IMAGE COMMUNICATIONS SYSTEM
OVERALL CONFIGURATION

IMAGE COMMUNICATIONS SYSTEM
CASE 1: CALLING SUBSCRIBER WITH IMAGE FILE MATCH
AND
REAL-TIME COMMUNICATIONS

IMAGE COMMUNICATIONS SYSTEM
CASE 2: CALLING SUBSCRIBER WITH IMAGE FILE MATCH
AND
STORE AND FORWARD COMMUNICATIONS

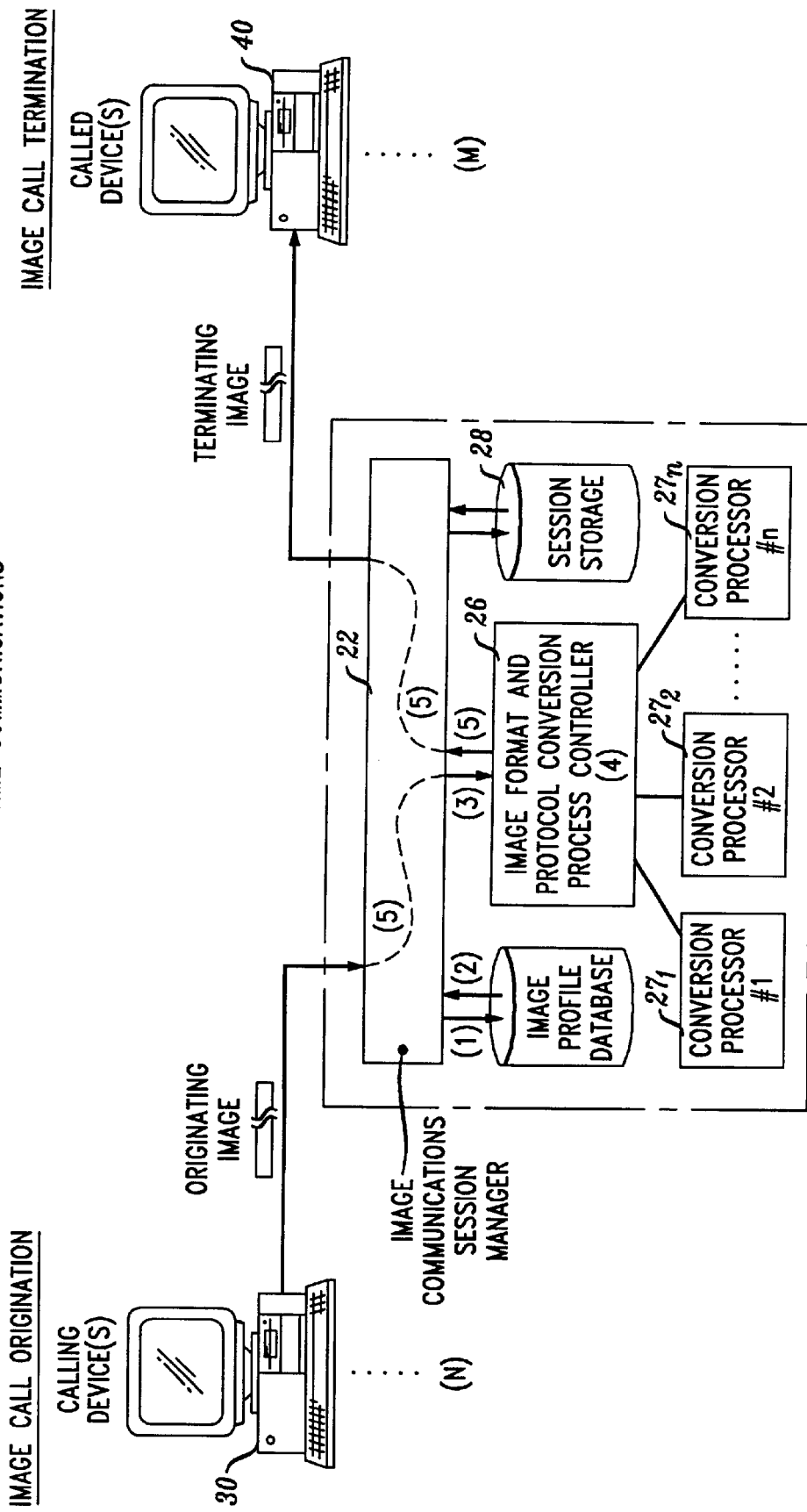

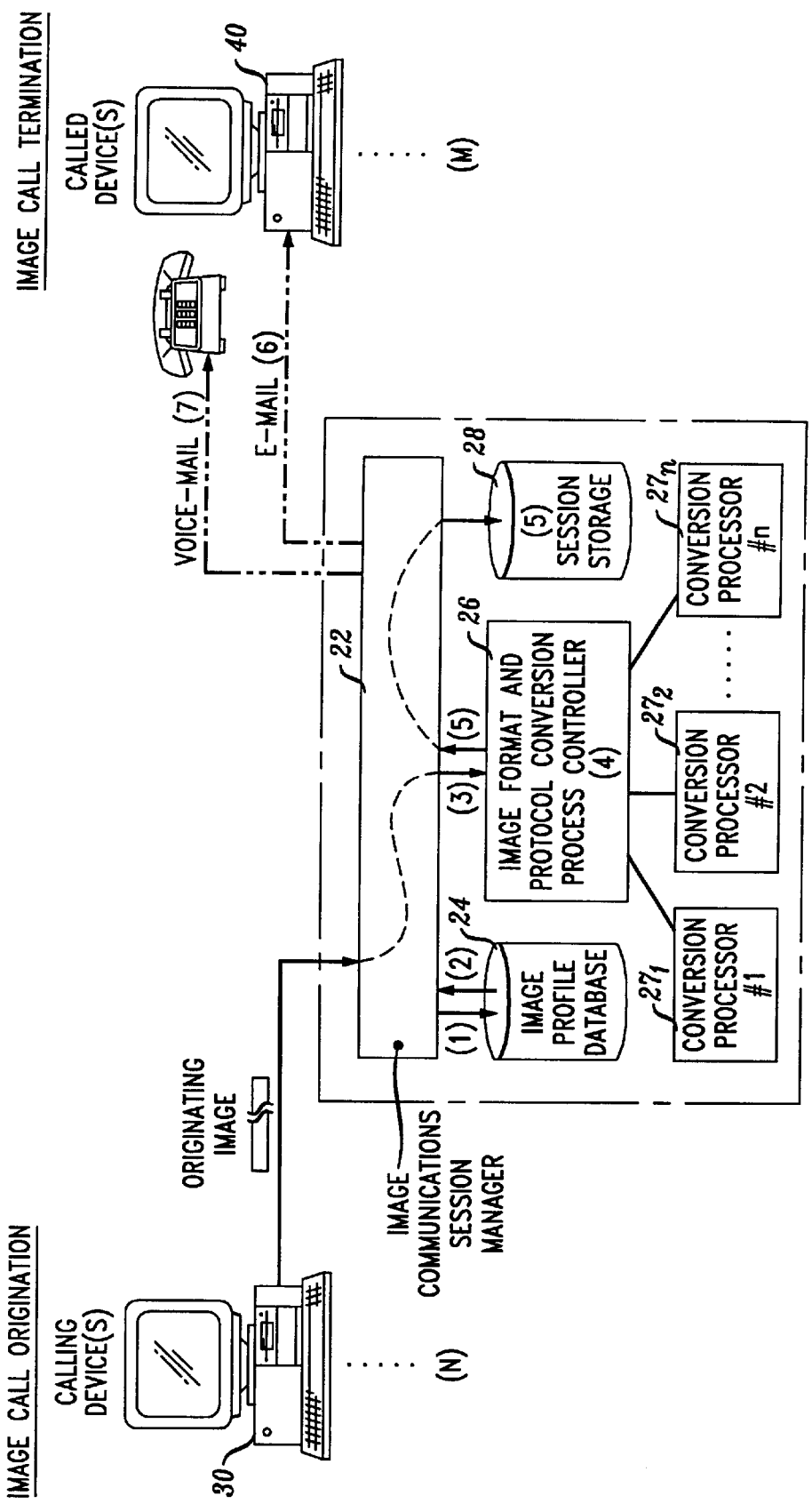

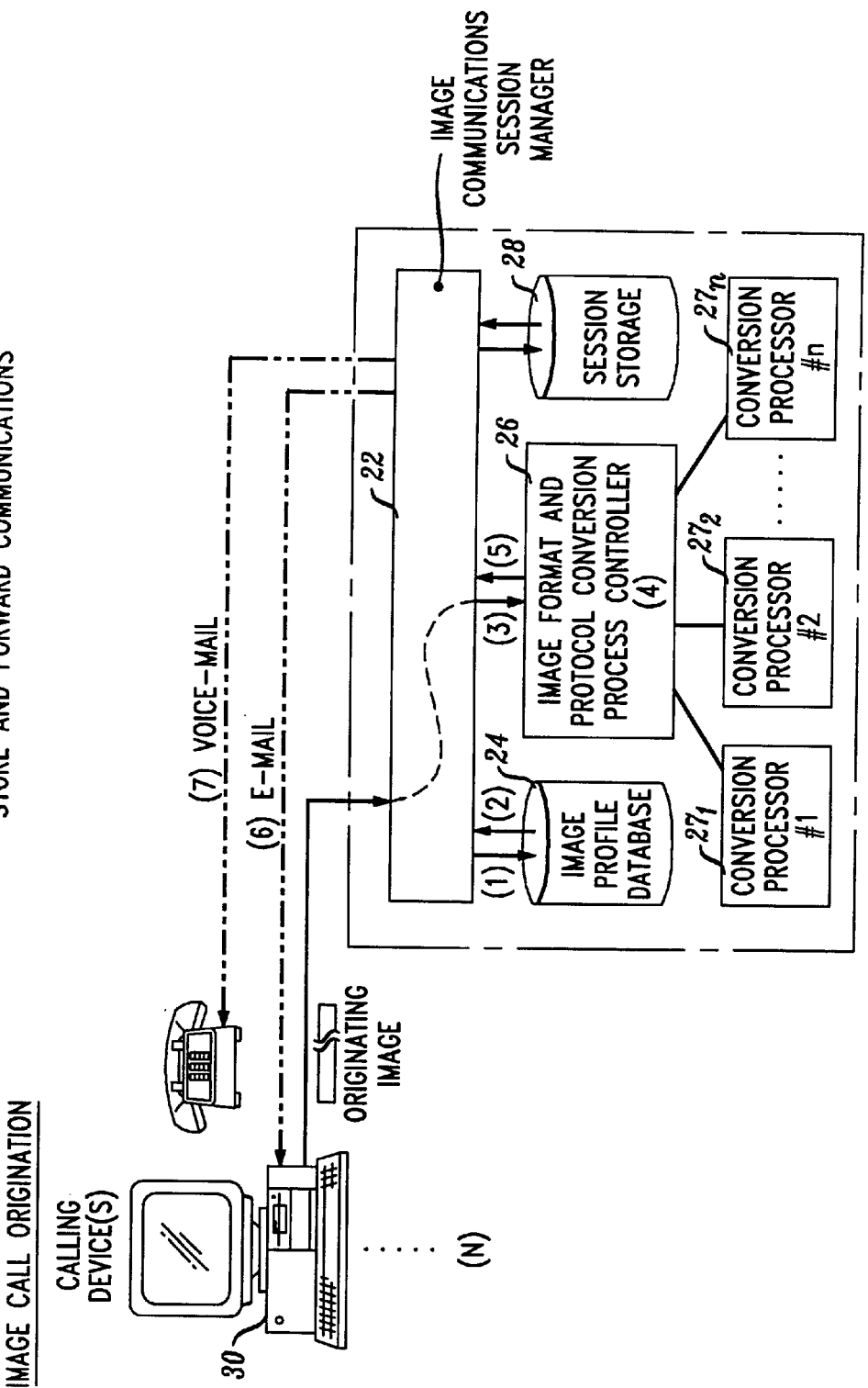

IMAGE COMMUNICATIONS SYSTEM
CASE 6: SUBSCRIBER CALLING A NON-SUBSCRIBER

NETWORK-BASED SYSTEM ENABLING IMAGE COMMUNICATIONS

This is a continuation-in-part of application Ser. No. 08/636,200, filed Apr. 22, 1996, ABN which is a continuation of application Ser. No. 08/175,022, filed Dec. 29, 1993, ABN.

TECHNICAL FIELD

The present invention relates generally to a method for image communications, and more particularly, to a method and system for communicating images across a network among users with disparate end systems running potentially dissimilar image protocols and formats.

BACKGROUND OF THE INVENTION

The problem of image file format compatibility has been an issue since the beginning of computer-based processing of even the most basic graphics. Each computer and software vendor developed a different approach to representation of graphics and images, often suited to a particular application area. For example, vendors of word processing systems each developed their own approach for the representation of pictorial information that could be incorporated in files generated by their platforms.

As end users began to network microcomputers, first over departmental local area networks, and then over wider area networks, the problem of file format compatibility began to grow. Today, with the widespread introduction of image, multimedia, and video systems, file format compatibility is a major issue in system development and operation.

A number of solutions to this problem have been introduced or proposed. At the applications level, file import and file export functions have been added which accommodate a few formats that are different from the active format of the application platform itself. The second solution has been the introduction of software which does nothing but convert one file format to another. A third solution is to convert all files to an intermediary format, which then can be used as the "universal language" among dissimilar systems, and then converted to a different native file format at a receiving end-user.

These approaches have proved useful in and of themselves for a number of situations, but as imaging applications become more prevalent, image processing software continues to evolve, image communications becomes more feasible over a wider range of system applications, and concomitantly as the need for and use of image communications increases, it becomes ever more difficult and costly for users to maintain updated premises software. Further, the requirement of converting between a multitude of formats and protocols serves as an impediment to widespread access and use of image communications.

SUMMARY OF THE INVENTION

The present invention overcomes the above, and other, limitations by providing a system which enables a multitude of dissimilar end-system devices, appliances, and platforms to interchange image information. In an embodiment of the present invention, a network-based image processing system includes a network-based data base which holds profiles of the end users. The profiles typically include the capabilities of the end systems of the subscribing end users for storing, processing, and displaying images, preferably including the acceptable and preferred image protocols, compression methods, and image formats for each user. A communication of an originating image from a calling party to a called party is diverted to the network-based image processing system. The network-based image processing system ascertains whether the originating image file format and protocol matches the called party preferred file format and protocol, which is stored in the data base. If there is no match, the processing system appropriately converts the originating image file to the format and protocol of the called party. The image file is then communicated to the called party. A handshake-like exchange may be used to enable image communications of parties that are not subscribers and do not have profiles in the database. In a further embodiment, the network-based nodal image processing system provides for file return to the called party. The method and system of the present invention may be applied in systems ranging from local premises-based communications to wide area communications on either private or public networks.

BRIEF DESCRIPTION OF THE DRAWINGS

The invention will be described in greater detail below by way of reference to the accompanying drawings, wherein:

FIG. 3A, FIG. 3B, FIG. 4A, FIG. 4B, FIG. 5, and FIG. 6 illustrate different information flow sequences in accordance with practicing the present invention for the system depicted in FIG. 2.

DETAILED DESCRIPTION OF THE PREFERRED EMBODIMENT

Figure 1A:
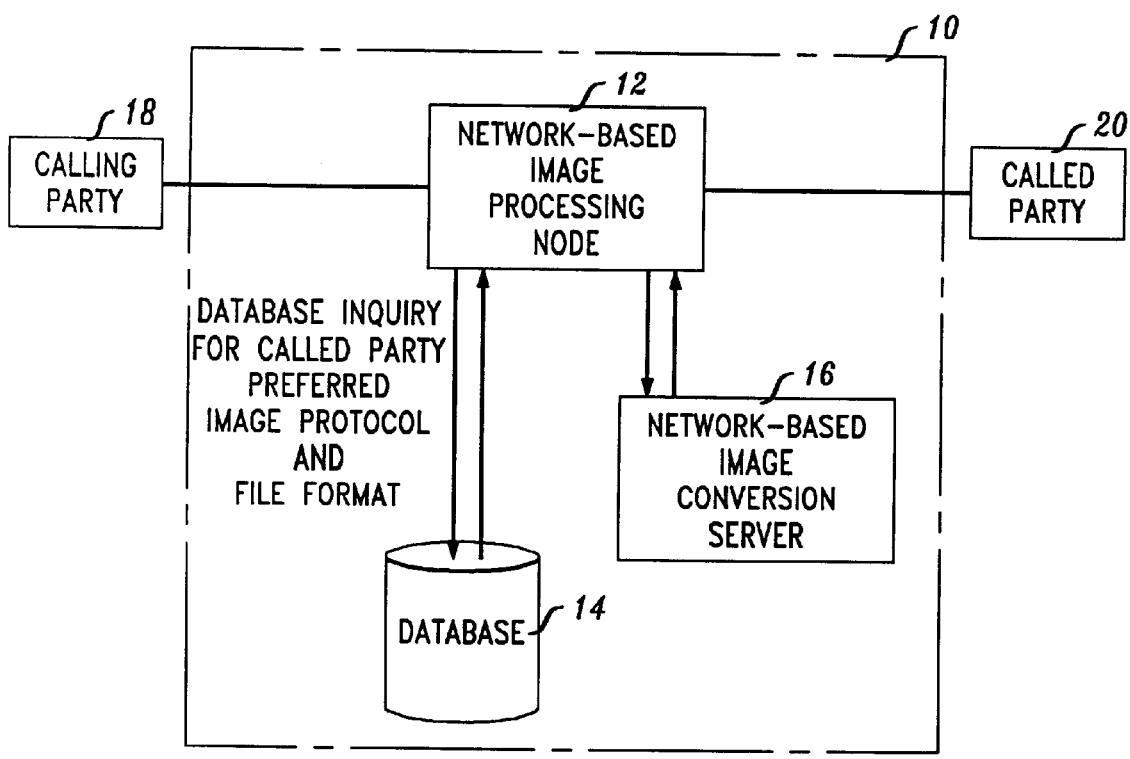
FIG. 1A shows a generic configuration of an image communication system in accordance with practicing the present invention.

FIG. 1A diagrams a generic system configuration in accordance with practicing the present invention, and is not limited to any particular network, but may represent for example, a private/premises-based network, or a public network such as a public switched telecommunications network (PSTN). As shown in FIG. 1A, a network-based image communications processing system 10 includes an image processing node 12, a database 14, and an image conversion server 16. Preferably, the database 14 maintains information for image service subscribers. As understood by one skilled in the art, such a system may be implemented as either a one-node or a multi-node distributed architecture, scalable as required, and may be either network-based or premises-based, or a hybrid combination of these. In a multi-node distributed architecture, preferably a plurality of image processing nodes 12, each which supports the image communications protocol, would access a centralized database 14, while a separate image conversion server 16 preferably would be located at each node and be accessible to other nodes via a gateway or bridge. If the network were to represent the AT&T interexchange network, for example, in addition to other possible network elements that are known to one skilled in the art, such a node may be implemented in accordance with one or more of the following elements: an adjunct processor (AP) (e.g., a network services complex "NSCx"), a network switch (e.g., 4ESS or 5ESS), and a service control point (SCP) (e.g., a network control point "NCP"). Such elements are well known in the art, as is their adaptation for implementing functions and services. As understood by one skilled in the art, overall system requirements will affect the preferred physical implementation of a network-based image communications system, and there are many variations and adaptations within the purview of the present invention.

Figure 1B:
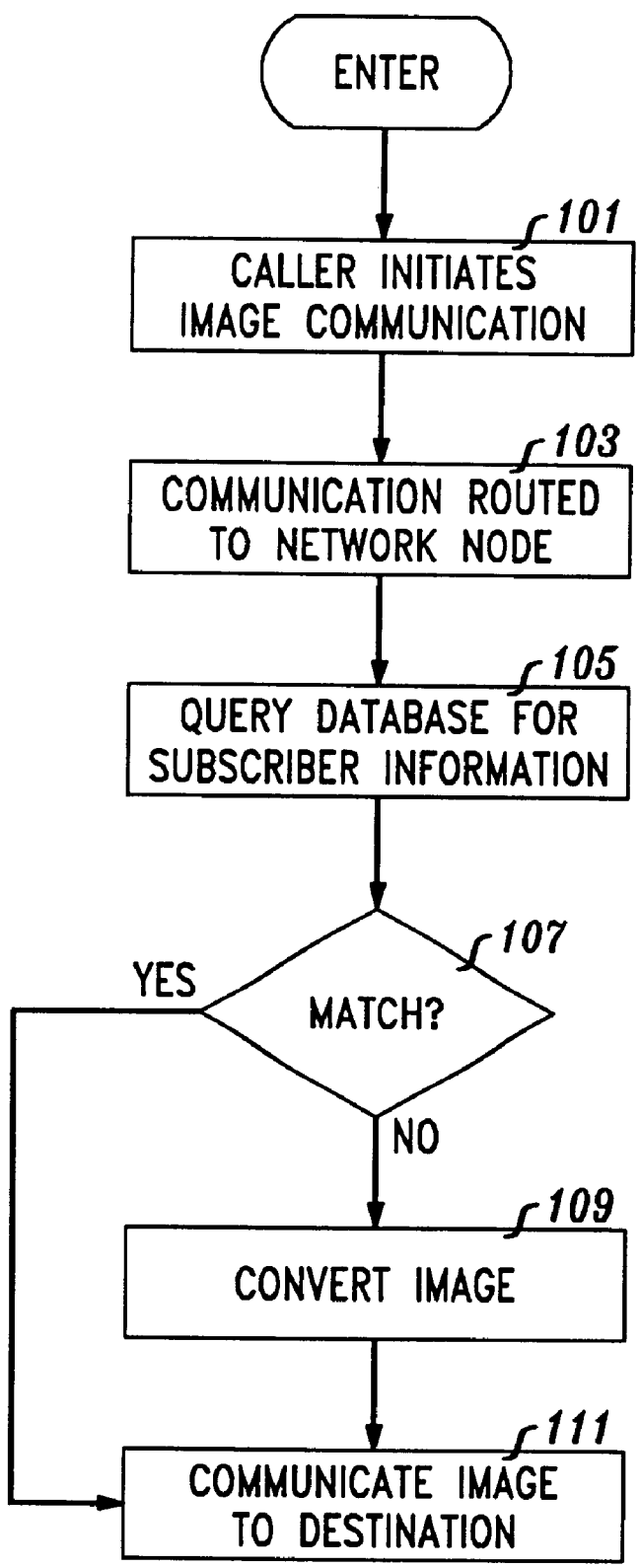
FIG. 1B is an operational flow chart of an exemplary process for image communications, in accordance with the present invention.

In accordance with the present invention, FIG. 1B illustrates an operational flowchart for a method of image communications. In step 101, a calling party 18 initiates an image communication to called party 20. This communication arrives at the network image processing node 12 (step 103), and the originating party's sending file format and protocol is compared to the preferred profile for the terminating party through a look-up procedure in the network-based database 14 (step 105). Next, in step 107, if the originating and terminating file formats match, then a direct communications channel (e.g., virtual circuit or direct circuit switched) is established between the respective parties (step 111). If the originating and terminating image file formats do not match, however, then the network-based service will invoke and attach image converter server 16 which will perform the necessary file format and protocol conversions (step 109), followed by establishing a connection to the called party (step 111) for communicating the converted file. The foregoing sequence of events may occur in real-time or may be implemented in a "store-and-forward" communications, in which the image data to be sent to the called party is temporarily stored within the network, and forwarded to the called party at a later time. It is further understood that the network may determine the format and protocol of the calling party image either by looking up this information in the database 14 during communication setup, or directly from the image data transmission, using either in-band or out-of-band signaling.

It is also understood that routing of the initial communications to the node in step 103 may occur in a variety of ways depending on the type of network with which the present invention is practiced, as well as the communications protocol. For example, if the network is the AT&T network and the calling device includes a modem, for example, then nodal access may occur via switched access using, for example, an 800 number or other special access code, or via a direct-network connection. On the other hand, if the network is a private network, then a special access code also may be used or the communications protocol may include a means for indicating that the data to be communicated is image data.

Figure 2:
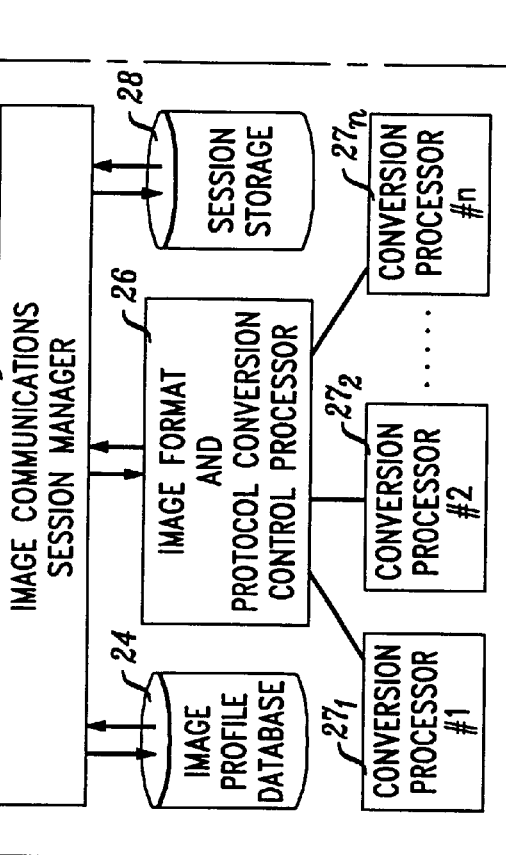
FIG. 2 shows a configuration of an image communication system in accordance with practicing the present invention.

The present invention may further be understood with reference to the embodiment shown in FIG. 2, which further illustrates elements of a nodal image communications system, and particularly a network-based image communications processing system 10, in accordance with practicing the present invention. Referring to FIG. 2, at a network node, a number of discrete servers are networked on a data link such as an Ethernet or FDDI (i.e., fiber distributed data interface) bus. As schematically depicted, more than one calling device 30 may access the network by any of a variety of means, including switched access or direct-network connection, and the network may connect to a called device 40 by any of a similar variety of means. It is understood that the servers, schematically depicted in FIG. 2A, generally comprise one or more physical devices having hardware and/or software to accomplish the herein described functions. In a most basic implementation, a single network node includes all servers; more generally, the servers may be distributed as determined by existing or desired system architecture, desired system performance, etc. Preferably, each of the servers include the following respective functions.

The session manager server 22 provides for input/output queuing of image conversion requests, and for login and password management of the incoming (call originating) party. It also stores (queues) the incoming image file(s) until processing is required (e.g., conversion), as well as the output file(s), which may be either held in session storage device 28 for future store-and-forward to the called party, or sent immediately after processing is completed. As an example of the types of hardware and software that must be supported to implement these functions, the session manager server 22 includes modem banks, e-mail support software, interfaces to voice-mail, memory storage devices, one or more programmable computers or workstations, programmable switches, etc.

The profile database server 24 provides a platform for the Subscriber Profile Database. This database contains a multi-parameter field for each subscriber, the elements of which describe the image file formats and protocols that can be accepted by this subscriber, as well as the preferred file format and protocol.

As may be appreciated, and as will be more fully understood below, from among the image file formats and/or protocols that can be accepted by the called party, the preferred file format and/or format indicated by accessing profile database server 24/Subscriber Profile Database (e.g., step 105 of FIG. 1B) may depend on one or more of various parameters, including the calling party image file format and protocol, the type of image (e.g., medical image, black and white photograph, graphics, text, etc.), minimum acceptable quality (e.g., spatial resolution, color resolution, etc.) for a given image type and/or format, desired transmission time for a minimum acceptable quality, etc. Based on the relevant ones of such parameters, which may be stored in the Subscriber Profile Database (network-based database 14) and/or obtained by querying the called party, network imaging processing system 10 determines the preferred or optimum image format and/or protocol from among the image file formats and/or protocols that are supported by the called party. Such processing to determine the preferred file format may be logically implemented by using one or more look-up tables which account for the possible combinations of these parameters, and may be appropriately partitioned in various ways between or among various elements of network image processing system 10, including image processing node 12 and database 14 of FIG. 1A, or session manager 22, image profile database 24, and control processor 26 of FIG. 2.

For instance, each profile in the Subscriber Profile Database of image profile database 24 may be structured itself as a look-up table logically indexed by such parameters, such that the preferred format and/or protocol is directly elicited by querying the Subscriber Profile Database (network-based database 14) and is dependent on such parameters as provided (explicitly or as a coded index) by session manager 22 (network image processing node 12) to profile database 24 for accessing the Subscriber Profile Database. In such an implementation, session manager 22 or profile database 24 may appropriately generate from the parameters an index used to access the look-up table of the Subscriber profile database. In an alternative implementation of the partitioning between network session manager 22 (and/or control processor 26, or generally image processing node 12 of FIG. 1A) and profile database server 22/Subscriber Profile Database (or generally network-based database 14 of FIG. 1A) of the processing required to determine the preferred format and/or protocol, each profile may store information identifying the supported formats and/or protocols and preferably also other user-specific parameters or preferences (e.g., maximum transmission time for certain image types, preferred default format and/or protocol, etc.), and profile database server 24 and/or session manager 22 and/or control processor 26 may implement a routine (e.g., using look-up tables indexed by the accessed profile information) to determine the preferred format and/or protocol as a function of one or more of the above parameters (i.e., format and/or protocol of the originating image, image type, etc.) and the information accessed from the given profile of the Subscriber Profile Database (i.e., available or acceptable image file formats and/or protocols supported by the called party, and any other user preferences, etc.).

The image file format conversion server converts the calling party image file to the acceptable or preferred image file format of the called party, depending on the option(s) selected by the calling party. This server preferably includes conversion control processor 26 and one or more conversion processors $27_1, 27_2 \ldots 27_n$. Additional image servers may provide other services, such as Image Catalog, Optical Character Recognition, Archiving, image enhancement, face recognition, image transformation (e.g., special effects, color changes, etc.), Image Transaction Processing such as conversion to EDI (Electronic Data Interchange, CCITT X. 12 Standard) or to batch data files for host entry, image groupware and image workflow, and bridging for image conferencing. Such applications may be provided by commercial application programs executed by the servers, or special purpose application software and hardware may be developed as necessary. As can be appreciated by one skilled in the art, the nodal service permits a large library of image processing software to be maintained and shared economically by many users.

In addition, the nodal image communications system may include other servers for providing additional functionality and services. For instance, an e-mail confirmation-back server may be used for sending out an e-mail message to the calling party regarding the disposition of the image being sent to the called party. Namely, that a file conversion was needed, was executed successfully, was forwarded to the calling party, and was received (file accessed) by the calling party. Also, as an adjunct or alternative to the e-mail confirmation-back server, a voice-mail confirmation-back server may inform the calling party of the same or similar actions, but through voice-mail messaging.

The nodal image communications system also preferably includes a gateway/bridge for connection to other network nodes which also provide network-based image processing. Such gateways provide for load distribution and balancing, but also for some specialized image processing services. The gateways may also connect to external systems.

In addition to the above Server functions, there are several access modes for the image nodal processor depicted in FIG. 1A. A preferred implementation is access from a PC or workstation, utilizing a protocol such as TCP/IP (Transmission Control Protocol/Internet Protocol). This access could be through a router/hub interface or directly from the workstation utilizing software such as SLIP (Serial Line Interface Protocol). At the low end, access into the nodal server is via a FAX/modem, in CCITT (ITU) Group 3 file format. In this case, there would preferably be provided an audio response unit which receives multifrequency tone (e.g., DTMF) entries from the calling party, and issues voice messages that elicit these tone responses. Whatever the access into the nodal server, these various front-end implementations pass files to the session manager 22.

In accordance with the present invention, image communication preferably occurs in one of two modes—the real-time mode or the store-and-forward mode. Real time implies that once the image data is transmitted from the calling device, there is no storage of the image data, or its derivatives, for transmission at a predetermined later time. In contrast, in the store-and-forward mode files converted at the node are held at the node until a predetermined later time at which they are sent to the designated called party. Designating one of these modes may be an option available to the caller, although the network itself may determine the mode according to factors such as traffic and/or queue conditions on the network, and the amount of image processing required. In addition, the store-and-forward mode may be the default mode, or presented to the caller as an option, when a connection cannot be made to the called party (e.g., busy signal). Also, the mode may be designated as a preferred mode of reception option that is specified by a subscriber and stored in the image profile database.

Figure 3A:
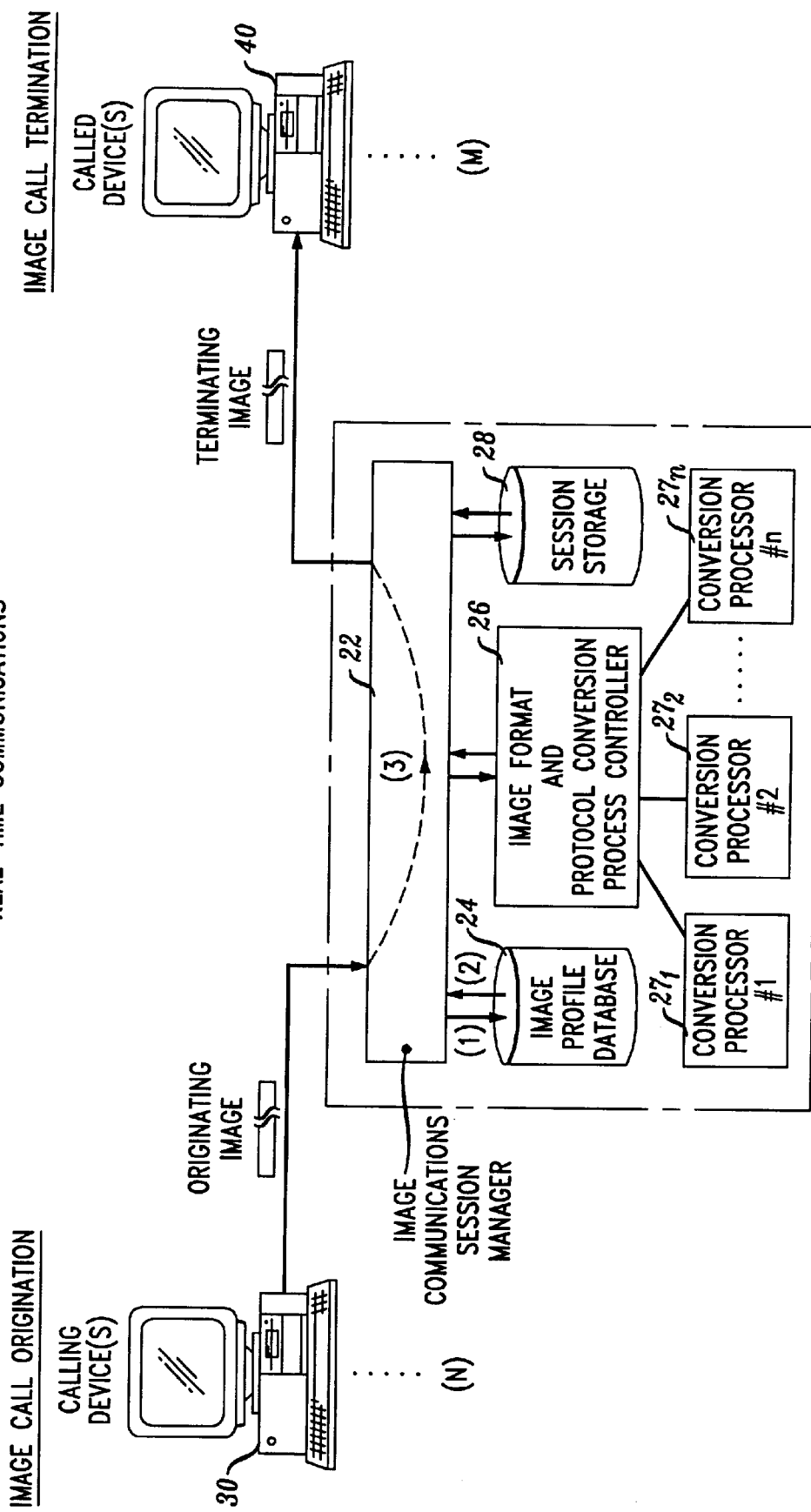

The present invention, and the foregoing system elements and their related functions, may be better understood with reference to FIGS. 3A–6 which further illustrate nodal image communications according to the present invention. FIG. 3A illustrates the signaling which occurs when a calling subscriber 30 initiates an image communication with an image file match to the called device 40, and wherein the communication occurs in real time. Such a call may be initiated via in-band or out-of-band signaling, and is routed to the image nodal processor (e.g., a network node). The image communications session manager 22 accesses the image profile database 24 to ascertain whether the originating image format and protocol matches that used or preferred by the called device. In this instance, since there is a match, the image communications session manager 22 establishes a connection between the calling device 30 and the called device 40, and the image is transmitted according to the predetermined transmission protocol using the originating image format.

Figure 3B:
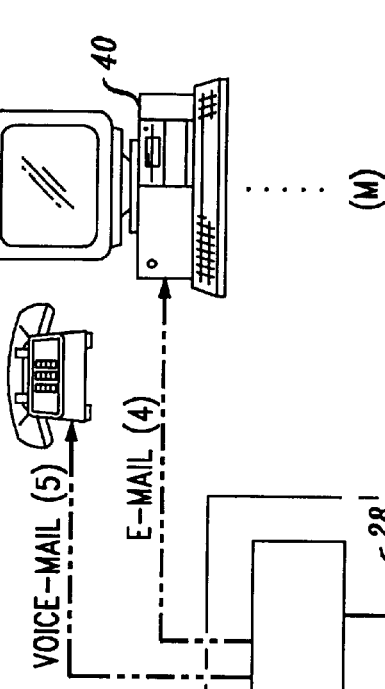

FIG. 3B illustrates the signaling which occurs when a calling subscriber initiates an image communication with an image file match to the called device, and wherein the communication occurs using the store-and forward mode. As discussed above, the store-and-forward mode may be selected by the calling party, or may occur as in response to a failed attempt in connecting to the called party. For instance, in response to the call arriving at the image nodal processor, the image communications manager 22 may direct an audio response unit to prompt the caller to enter the preferred communications mode using the touch-tone keypad on a telephone station or by entering a response from the keyboard of the calling device (e.g., personal computer, workstation, etc.). The sequence of events initially proceeds as in the case illustrated in FIG. 3A, with a match being indicated by the query of image profile database 24. However, instead of immediately establishing a connection to the called device, the image communications session manager establishes a connection from the calling device to the session storage device which stores the converted image data. The image communications session manager then initiates a communication, by voice-mail and/or e-mail for example, to the called device station using a station identifying number (e.g., phone number) stored in the image profile database 24. This communication indicates that an image file is stored at the image nodal processor.

Preferably, in order to retrieve images from the image communications system, the user accesses the image nodal processor via a special access number (e.g., an 800 number) or, in alternative embodiments, via an internet address. Once the user is connected to the image nodal processor, the user may be identified by entering a personal identification number (PIN) in response to a prompt by the audio response unit, or a distinguishable 800 number may be assigned to each user. The caller then interacts with the image nodal processor, again preferably via the audio response unit or a terminal connection, to access any files stored in the user's file-folder. The selected files are then retrieved from the storage device and transmitted to the user.

FIG. 4A illustrates the information flow which occurs when the originating image does not match the format and protocol of the called device. In this case, since access of the image profile database 24 indicates that there is no match, the image communications session manager 22 provides the image format and protocol conversion process controller 26 with the format and protocol of the called device. The image communications session manager 22 then routes the originating image to the image format and protocol conversion process controller 26 which, in turn, routes the image data to an appropriate conversion processor. The conversion process controller 26 selects an appropriate conversion processor based on factors such as functionality, as well as availability and load balancing (e.g., queue management). Originating image data that has been converted is then routed to the called device via the conversion process controller 26 and the image communications session manager 22. If such a call occurs in the store-and-forward mode then the converted data is output to the session storage device 28 (FIG. 4B), and the image communication session manager 22 then initiates a communication to the called device (e.g., voice-mail or e-mail) indicating that a file has been stored.

FIG. 5 illustrates the information flow which occurs when the originating image does not match the preferred format and/or protocol of the terminating device, and the file cannot be converted by the nodal image processor. In such an instance, as above, the communications session manager 22 first receives the originating image communication, and queries the image profile database 24, determining that a conversion is required. The conversion information and the originating image are provided to the conversion process controller 26 which ascertains that the originating image cannot be converted by the conversion processors due to incompatibility or error. The conversion process controller 26 signals this error condition to the communications session manager 22 which then launches an e-mail or voice-mail message to the calling device 30, indicating that the communication could not be completed because the file was non-convertible.

Figure 6:
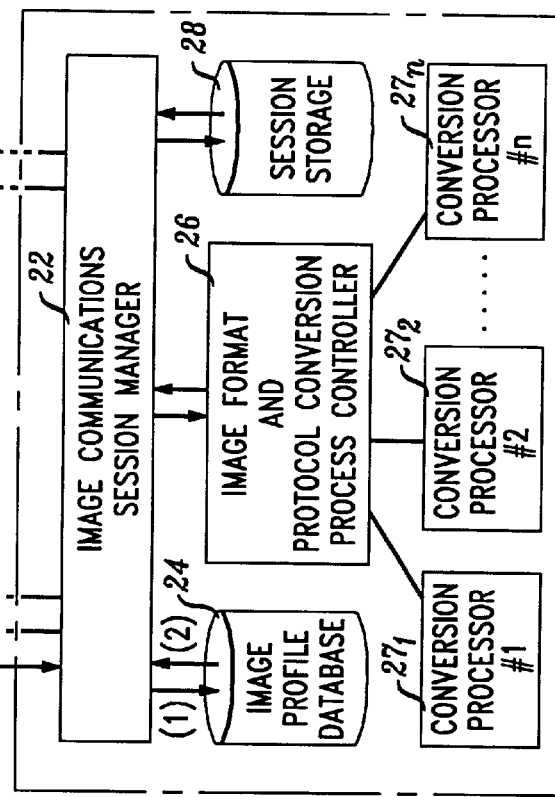

Another illustration of the processing and signaling performed by the network-based image processor is illustrated by FIG. 6, wherein a subscriber attempts to send an image to a non-subscriber. In this case, the query to the image profile database 24 indicates that the called party is not a subscriber, and therefore, since there is no information regarding protocol and format of the called device 40 a conversion (if required) and communication is not performed. A voice-mail or e-mail message, or both, indicating an attempted image communication thereto, is sent to the called device 40. A message back to the calling device, indicating the failed attempt, is also preferably communicated via e-mail or voice-mail. In a further embodiment, before leaving a voice-mail or e-mail message, the communications session manager 22 may attempt to complete a call to the called device 40 and, via the audio response unit, indicate that an image communication is pending from calling device 30 (e.g., using calling party automatic number identification "ANI"), and inquire whether receipt is desired, and if so, what type of format and protocol is desired for receiving the image communication. Then the nodal image processor may perform the image conversion and communication as described hereinabove.

In accordance with the present invention, file return to the initiating user is also provided. As opposed to transmitting an image to a called party, a subscriber may transmit an originating image to the nodal image processor for image processing, and then receive the processed output image. For example, a secretary may desire to convert the FAX of several pages to a particular word processing format. An illustrative embodiment for effecting file return is for the calling party 30 to dial a special access number (e.g., 800/900 number) for accessing the network-based nodal image processor; for example, this could be the same number used for file retrieval. The communications session manager 22 then interacts with the user via the audio response unit (or a terminal connection), providing the subscriber with a series of prompts in order to ascertain, as evinced by the subscribers responses, the type of processing desired by the subscriber. For example, the first prompt may determine whether the subscriber wishes to retrieve a file or use the file return processing functions. If the user selects the latter, then the audio response unit may query the type of function desired (e.g., optical character recognition, file conversion, etc.). As understood by one skilled in the art, the image data communications protocol and/or format may include information concerning the type of conversion to be performed (e.g., the type of format of the originating image, terminating image, type of file conversion, etc.), in which case queries by the audio response unit would not be required for this information. After establishing the desired processing, the file is sent to the image nodal processor for performing the desired function, and then returned to the subscriber either directly or using the store-and-forward mode.

The foregoing illustrations are demonstrative of the myriad services which may be provided by the present invention. It can be understood that the present invention allows image communications among dissimilar end systems, as well as subscriber access to image processing services, including personal computers supporting a range of image protocols, image phones, facsimile machines, dialable video services, optical character recognition, media conversion/image translation services, and PDAs (i.e., personal digital assistants), and can be practiced in environments ranging from local premises-based communications to wide area communications on either private or public networks, and thus has wide applicability not limited to the hereinabove disclosed embodiments.

Dialable video services may include conversions among various video standards and among different video performance levels. A specific example is a teleconferencing application in which a 64 Kb/sec codec at one location needs to connect to a codec at another location that adheres to another video standard, say MPEG (Motion Picture Experts Group) at 1.5 MB/sec. If based on the nationwide telecommunications network, a toll switch (e.g., 4ESS) mediates call setup and diversion to the image nodal processor platform. At this platform, conversion among the two video formats takes place entirely within the digital domain, without returning to baseband analog video, as is commonplace for current video conversions. If both codecs use the same speed, then the platform can be used for other services, such as compression, or administrative functions. Administrative features could include managing multi-location access, reservations, encryption keys, and video testing and maintenance.

Although the above description provides many specificities, these enabling details should not be construed as limiting the scope of the invention, and it will be readily understood by those persons skilled in the art that the present invention is susceptible to many modifications, adaptations, and equivalent implementations without departing from this scope. It is appreciated that there are many additional variations which may be implemented in accordance with the present invention. For instance, if the called party is not a subscriber, then the network may obtain the preferred format and protocol by prompting the called party. In addition, the called party may have certain on-site image processing capabilities while lacking others, and therefore, such a subscriber may only subscribe to certain image processing services. Further, if the image profile database includes information such as whether a subscriber has image decompression utilities available, or whether the subscriber only requires and/or desires less than all the originating image data for certain types of data, then the nodal image processor can appropriately compress the image transmitted to such a subscriber. An additional feature which may be practiced in accordance with the present invention is for a subscriber to specify a set of non-subscribers from whom the subscriber wishes to receive image communications. This specified information would be stored in the subscriber image profile database, and used to effectuate image communication from a specified non-subscriber to a subscriber. Also, the present invention may include batch image processing with delayed store-and-forward distribution. This distribution may be to one or more widely separated locations. For example, a law firm may wish to convert hundreds of pages of printed text to a word processing format, with both return to the originating office (e.g., file return) and transport to a remote location. Moreover, as discussed above, access and communication to the network may be effected in a variety of ways, using a variety of network formats and protocols. It is also understood that the present invention is not limited to implementation on a public-switched telephone network, but also may be implemented on a data network (e.g., public internet or private intranet) using, for example, packet-switched communications. Also, it is appreciated that while the foregoing illustrative embodiments described with reference to FIGS. 3A–6 describe the source and destination stations as "calling" and "called" stations, this nomenclature is used only for illustrative purposes and clarity of exposition: either the source device (i.e., device initially having the image to be communicated) or destination station (device to which the image is to be communicated from the source) may initiate the transaction or session for communicating the image from the source device to the destination device (e.g., the destination device may request the image from the source device). It is also understood that the present invention may be implemented such that a given image may be broadcast from a source device to multiple destination devices (e.g., multiple destination addresses specified by source device), each destination device supporting one or more arbitrary formats, with the network processing system appropriately converting (if necessary) and communicating the image for each destination. It is understood that such processing for each destination may be effected according to, for example, parallel processing (e.g., distributed over the network), multi-processor, or pipelined techniques in order to provide substantially parallel broadcast and/or higher throughput of the image communication to the multiple destinations.

It is understood and appreciated from the foregoing that the network-based image processing system 10 according to the present invention provides (a network service) for an end point which is a recipient of an image (e.g., receiving station or party) to be able to receive an image in a preferred, optimum, or best format and/or protocol from among the formats and/or protocols supported by the recipient station, regardless of the format of the image as transmitted by a sender station (the receiving station is potentially limited concerning which types of images can be viewed and/or printed). The preferred, optimum, or best format and/or protocol may depend on one or more of myriad parameters, such as the format and protocol of the transmitted image, the desired quality for a given image type, the fastest transmission time at a minimum acceptable quality, etc. There are a variety of parameters upon which such a determination may depend, and it is understood that for an arbitrary set of parameters, there are various ways of implementing a routine or algorithm to select the preferred or optimum format and/or protocol as a function the parameters. The system may support myriad image media (e.g., facsimile, video, graphics, etc.), as well as multiple formats of any given medium, and may convert between different formats of the same medium and between formats of different media as required to provide the preferred or optimum format and/or protocol for receiving the image at the endpoint.

It is appreciated that in accordance with the present invention, the sending party may transmit an image in any of multiple formats of an arbitrary medium, where the format may be based on a set of parameters, such as compression method, options applied for the compression method, resolution, number of colors, etc. Also, the transmitted image information may optionally include a tag indicating the image type (e.g., black-and-white photographic, medical image such as an MRI scan or X-ray, page of text, graphics, etc.).

The receiving party may have established with the network service a profile that preferably specifies which formats (e.g., including compression schemes) it supports, as well as its capabilities and/or preferences in terms of other image parameters, such as resolution, number of colors, etc. Alternatively, all or some of this information may be obtained by the network service as needed, with the network service querying the receiving station concerning its capabilities.

The network service uses the information about the originally transmitted image (i.e., format and/or protocol, and preferably also image type information) and the capabilities (and possibly also preferences) of the receiving station to select the best possible match or preferred image format and/or protocol from among the image file formats and/or protocols that are supported by the receiving station. The network performs any transcoding or image transformations that are necessary. It is appreciated that the routine or rules for determining the best possible match between originating image format and/or protocol and the image format and/or protocol for transmission to the receiving station from the network may be implemented in various ways depending on the characteristics of various formats, and preferably incorporates user-specified preferences or parameters. The best possible match may be made using a set of look-up tables to decide, for instance, which of the available compression schemes and transcodings preserves the best quality of the image.

By way of example, assuming a photographic image in a JPEG format (or other high-resolution format) is to be sent to a receiving station which supports a JPEG format (or other high-resolution formats) different from that of the original image and supports a G3 facsimile format, the original image should be converted to another JPEG format rather than the G3 fax format in order to provide the best resolution available for reproducing the photographic type image. On the other hand, a page of text originally in JPEG could be converted to G3 fax since speedy transmission would be the goal, with high resolution and image quality of secondary interest.

The network service converts the originating image, as required, to provide the best match or preferred format, and sends (either directly in a real-time mode or in a store-and-forward mode) the resulting converted image to the recipient end station. The service may also alert the recipient with a message about the original format, the transcodings, and any other relevant information so that the recipient is aware of possible loss of quality.

In accordance with the present invention, it is understood that the network service may also support and provide a network mediated handshake that establishes which image format should be used in a transmission (from among those that are supported by the sending station) so that a sending station could send the best quality version of an image directly to the receiving station once the network establishes which format or version of the image should be sent. The network may obtain the required information (e.g., supported formats) for the sending station in a similar manner as for the receiving station, by database query and/or by querying the sending station. Alternatively, the network service may provide a network mediated handshake that establishes (as determined by the network service) which image format should be used in transmission by the originating station for conversion by the network service into a format for receipt by the receiving station, based on the best match between the formats respectively supported by the sending station and recipient station for communication of the subject image information.

Further, it is appreciated that progressive image coding schemes may be used in accordance with the present invention, with the receiving station specifying or deciding the acceptable quality of an image, thus avoiding the necessity of downloading the entire image file containing the extra data required for successively higher resolution images.

Although the above description provides many specificities, these enabling details should not be construed as limiting the scope of the invention, and it will be readily understood by those persons skilled in the art that the present invention is susceptible to many modifications, adaptations, and equivalent implementations without departing from this scope. These and other changes can be made without departing from the spirit and the scope of the invention and without diminishing its attendant advantages. It is therefore intended that the present invention is not limited to the disclosed embodiments but should be defined in accordance with the claims which follow.

What is claimed is:

1. A network-based method for communicating an image signal from a calling device to a called device via a network having a network image processing system, wherein said calling device and called device are each an arbitrary one of a plurality of device types, said method comprising the network image processing system executed steps of:

receiving at the network image processing system via the network a signal indicative of the image signal from said calling device which is coupled to the network via an arbitrary network connection type, said signal characterized by an arbitrary format and protocol from among multiple formats and protocols for representing and communicating the image signal, said multiple formats including at least a plurality of formats for a given image medium;

said network image processing system comparing characteristics of said image signal with image characteristic information of said called device, said called device coupled to the network via an arbitrary network connection type and using at least one arbitrary format and protocol from among said multiple formats and protocols for representing and communicating image signals, said multiple formats including at least a plurality of formats for a given image medium;

said network image processing system converting said image signal directly into a converted image signal compatible with said called device when said comparing step indicates that the characteristics of said image signal are different from said image characteristic information of said called device; and said network image processing system communicating information via the network to said called device according to a communication protocol compatible with said called device, said information including said converted image signal when said converted image signal is generated in said converting step, said information including said image signal when said converted image is not generated in said converting step;

said network image processing system thereby selectively converting between arbitrary image formats from among the multiple image formats, and receiving and communicating the image signal between arbitrary device types via arbitrary respective network connection types according to respective arbitrary protocols from among the multiple protocols, and having the capability of converting to or from one of a plurality of formats for a given image medium.

2. The method according to claim 1, wherein said signal includes said image characteristic information of the called device, wherein said image characteristic information of the called device differs from the characteristics of said image signal, thereby providing for image format conversion of the image signal.

3. The method according to claim 1, further comprising the step of communicating said converted image to said calling device according to a communication protocol information compatible with said calling device.

4. The method according to claim 1, wherein said comparing step includes retrieving said characteristic information of said called device from a storage means included in said network image processing system.

5. The method according to claim 1, wherein said comparing step includes obtaining said characteristic information of said called device according to a communication initiated by said network image processing system with said called device.

6. The method according to claim 1, wherein said comparing step includes obtaining said characteristic information of said called device from said signal.

7. The method according to claim 1, wherein information indicating said communication protocol is contained on a storage means included in said network image processing system.

8. A network-based method for communicating an image from a source device to at least one destination device via a network having a network image processing system, wherein said source device and destination device are each an arbitrary one of a plurality of device types, said source device operative in selecting said at least one destination device, the method comprising the network image processing system executed steps of:

receiving at the network image processing system via the network a signal including information representing said image from said source device which is coupled to the network via an arbitrary network connection type, said signal characterized by an arbitrary format and protocol from among multiple formats and protocols for representing and communicating the image, said multiple formats including at least a plurality of formats for a given image medium;

said network image processing system processing said image directly into a processed image according to said signal, said processed image compatible with said at least one destination device and having an arbitrary format and protocol from among said multiple formats and protocols for representing and communicating image signals, said multiple formats including at least a plurality of formats for a given image medium; and communicating said processed image via said network to said at least one destination device, each said at least one destination device coupled to the network via an arbitrary network connection type and using at least one arbitrary format and protocol from among said multiple formats and protocols for representing and communicating image signals;

said network image processing system thereby selectively converting between arbitrary image formats from among the multiple image formats, receiving and communicating the image signal between arbitrary device types via arbitrary respective network connection types according to respective arbitrary protocols from among the multiple protocols, and having the capability of converting to or from one of a plurality of formats for a given image medium.

9. The method according to claim 8, wherein said at least one destination device includes said source device.

10. The method according to claim 8, further comprising the steps of signaling an information request to said source device; and receiving a reply signal in response to said information request, said reply signal operative for selecting the type of said processing.

11. A network-based image processing system for communicating an image from a calling device to a called device via a network connected to said calling device and said called device and having a network image processing system, wherein said calling device and called device are each an arbitrary one of a plurality of device types, the network image processing system comprising:

means for storing called device information, called device information including image characteristic information of said called device;

means for receiving via the network a communication of said image from said calling device which is coupled to the network via an arbitrary network connection type, said communication characterized by an arbitrary format and protocol from among multiple formats and protocols for representing and communicating the image, said multiple formats including at least a plurality of formats for a given image medium;

means for comparing characteristics of said image with said called device information, said called device coupled to the network via an arbitrary network connection type and using at least one arbitrary format and protocol from among said multiple formats and protocols for representing and communicating images, said multiple formats including at least a plurality of formats for a given image medium;

means for processing said image directly into a processed image compatible with said called device in response to said comparing means;

means for communicating said processed image or said image via the network to said called device;

said network image processing system thereby selectively converting between arbitrary image formats from among the multiple image formats, and receiving and communicating the image between arbitrary device types via arbitrary respective network connection types according to respective arbitrary protocols from among the multiple protocols, and having the capability of converting to or from one of a plurality of formats for a given image medium.

12. The network-based image processing system of claim 11, wherein said called device is said calling device, and wherein said signal includes said characteristic information of the called device, said characteristic information including image format information which differs from image format information associated with the image received at the network image processing system from the calling device, thereby providing for image format conversion of the image and for return of the converted image to the calling device.

13. The network-based image processing system of claim 11, wherein said means for processing includes the function of format conversion.

14. The network-based image processing system of claim 11, wherein said means for processing includes the function of image compression.

15. The network-based image processing system of claim 11, wherein said means for processing includes the function of optical character recognition.

16. The network-based image processing system of claim 11, further comprising a means for storing said processed image.

17. The network-based image processing system of claim 16, further comprising a means for retrieval of said processed image by said called device.

18. A network-based method for communicating an image from a source device to a destination device via a network having a network image processing system, said method comprising the network image processing system executed steps of:

receiving at the network image processing system via the network a signal representative of the image from said source device, said signal characterized by an arbitrary format for representing the image;

said network image processing system determining a preferred format for communicating the image to said destination device, based on characteristics of said signal and image characteristic information of said destination device, said destination device capable of supporting and using a plurality of arbitrary formats for representing image information, said preferred format being one of said plurality of arbitrary formats supported by the destination device;

said network image processing system converting said signal into a converted signal representing said image and having said preferred format, said converting being executed when said preferred format is different from arbitrary format of said signal; and said network image processing system communicating the image using said preferred format to said destination device, said image represented by said converted signal when the converted signal is generated in said converting step.

19. The method according to claim 18, wherein the format of said signal and the plurality of formats supported by the destination device are each an arbitrary format of an arbitrary one of a plurality of media, and said converting step is capable of converting between formats of different media and between different formats of the same medium.

20. The method according to claim 18, wherein either said source device or said destination device is capable of initiating communication of said image from said source device to said destination device.

21. The method according to claim 18, wherein said network is a public or private data network.

22. The method according to claim 18, wherein said network is a public switched telephone network.

23. A network-based method for communicating an image from a source device to a destination device via a network having a network image processing system, said destination device supporting said method comprising the network image processing system executed steps of:

receiving at the network image processing system via the network a signal from said source or said destination device indicative of transferring the image from said source device to said destination device;

said network image processing system determining a first preferred format for said source device to send said image, based on information of one or more formats supported by said source device and on information of one or more formats supported by said destination device; and said network image processing system communicating said first preferred format to said source device or to said destination device.

24. The method according to claim 23, wherein said network image processing system communicates said first preferred format to said source device, said first preferred format is supported by both said source and said destination device, and further comprising the step of said source device communicating directly to said destination device the image using said first preferred format.

25. The method according to claim 23, wherein said network image processing system communicates said first preferred format to said source device, said first preferred format not being supported by said destination device, and further comprising the steps of:

said source device communicating to said network image processing system the image using said preferred format;

said network image processing system converting said image into a converted signal representing said image and having a second preferred format, said second preferred format being supported by said destination device and determined during said determining step; and said network image processing system communicating the image using said second preferred format to said destination device.

* * * * *